Sept. 4, 1962    W. KNAUF    3,052,273
CARRYING CASE FOR PHOTOGRAPHIC CAMERAS
Filed Feb. 16, 1961    2 Sheets-Sheet 2
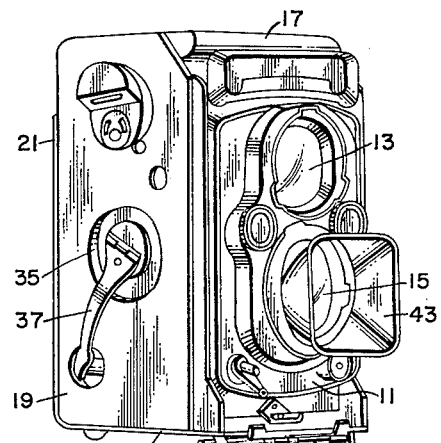
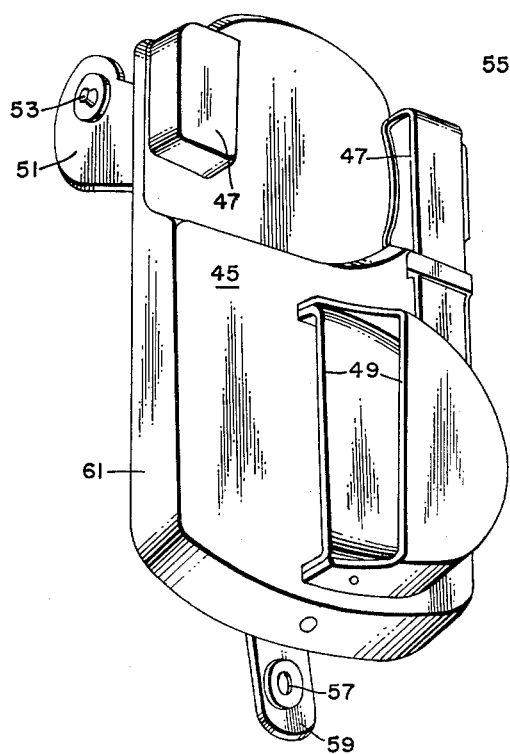

United States Patent Office 3,052,273
Patented Sept. 4, 1962

3,052,273
CARRYING CASE FOR PHOTOGRAPHIC
CAMERAS
Wilhelm Knauf, Braunschweig, Germany, assignor to Franke & Heidecke, Fabrik Photographischer Präzisions-Apparate, Braunschweig, Germany, a firm of Germany
Filed Feb. 16, 1961, Ser. No. 89,785
Claims priority, application Germany Apr. 6, 1960
5 Claims. (Cl. 150—52)

The present invention relates to carrying cases for photographic cameras and, more particularly, to carrying cases of the type known as ever-ready cases, so constructed that the camera does not have to be removed from the carrying case in order to take a picture, but merely a part of the case is opened up to enable the picture to be taken. As most frequently used, the camera in the case is suspended by a carrying strap from around the neck of the operator, and the top cover and front wall are movable forwardly and downwardly to a position depending from a hinge on the bottom wall of the case.

An object of the invention is to provide a generally improved and more satisfactory carrying case of the kind described having provision for housing various optical accessories such as supplementary lenses and filters.

Another object is to provide a holding device for optical accessories arranged within a carrying case so designed that the accessories are protected when the case is open, the holding device being moved, when it is desired to get at the accessories, to an operative position in which the accessories are readily accessible but sufficiently held to prevent accidental dropping out of the case.

A further object is the provision of an improved ever-ready carrying case for a camera having a holding device for optical accessories which can be housed within the case or else optionally removed or interchanged for another holding device.

These and other desirable objects may be attained in the manner disclosed as an illustrative embodiment of the invention in the following description and in the accompanying drawings forming a part hereof, in which:

FIG. 2 is a view similar to FIG. 1 with the holding device swung forwardly to operative position braced by the cover of the case; and FIG. 3 is an enlarged perspective view of the removed holding device for accessories.

Figure 1:
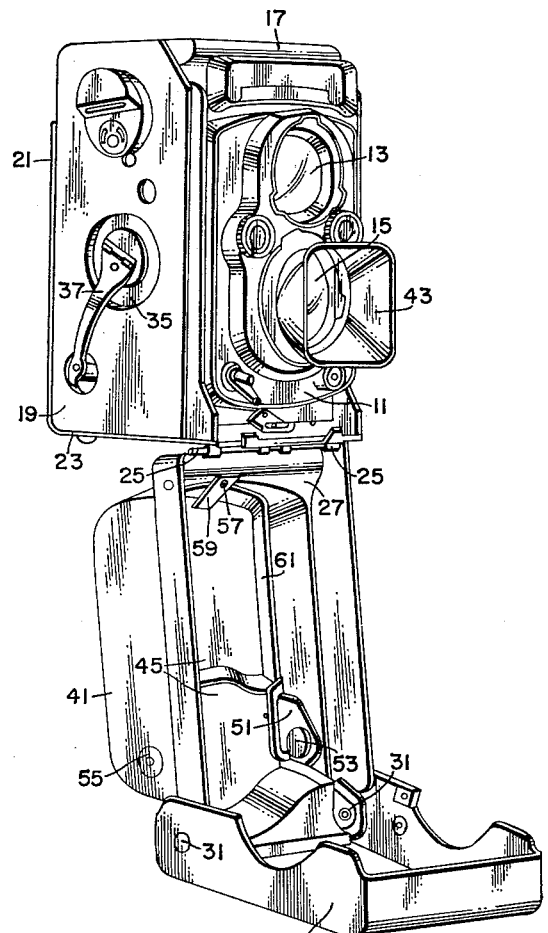
FIG. 1 is a perspective view of a camera disposed within a carrying case according to the invention, the carrying case being opened up ready to take a picture and the holding device for optical accessories being shown in storage position folded inwardly within the front wall of the case.

The ever-ready carrying case of the invention in its preferred form is of a size to encase a camera 11 of the twin lens reflex type. The camera 11 may be of any suitable construction and has a focusing viewfinding lens 13 disposed above an exposure lens 15, light rays passing through the lens 13 being reflected in the conventional manner by a mirror obliquely mounted within the camera to reflect the image onto the usual focusing screen at the top of the camera, visible when the focusing hood 17 is opened up. The ever-ready case includes a main portion enclosing the camera 11, this main portion comprising a pair of side walls 19, a back wall 21, and a bottom wall 23 all connected together as a permanent unit. A hinge 25 is provided at the front edge of the bottom wall 23 for connecting a front wall 27, here shown swung open to a forwardly and downwardly extending position depending from the hinge 25 so as to expose the lenses 13 and 15 of the camera ready to make an exposure. A lid or cover member 29 is pivoted to the free end of the front wall 27 by means of a hinge 31. With the case closed up to form a box, it can be seen that the front wall 27 covers the front of the camera 11 while the cover member 29 extends across the top of the focusing hood 17, asuming that the hood 17 has been closed down as shown.

The side walls 19 and back wall 21 of the carrying case desirably are provided with various apertures so that the operating members of the camera extend through and are visible for setting the camera or making the exposure. For instance, one side wall 19 has an aperture 35 through which the winding crank 37 of the camera extends, to be in position to be actuated even when the case is on the camera.

The hinge 25 between the bottom and front walls may take the form disclosed in greater detail in applicant's copending patent application, Serial No. 823,252, filed June 26, 1959. This type of hinge allows the top cover and front wall unit to be swung from an upstanding closed position to a downwardly depending open position, or alternatively allows the removal of the top cover and front wall unit completely from the remainder of the case and enclosed camera. However, the hinge 25 may also take the form of a non-separable hinge such as is illustrated in Patent No. 2,681,600 to R. Heidecke, granted June 22, 1954, the details of construction of this hinge 25 being unimportant so far as the present invention is concerned. The hinge 31 between the front wall 27 and the cover member 29 desirably takes the form described in this patent, and includes a spring for folding the cover member 29 up parallel to the front wall 27 when the front wall and cover member unit is unfolded. This position of the cover member 29 is not illustrated in FIG. 1, in order to show better the interior detail of the front wall 27. Although not here illustrated, the carrying case is preferably provided with a carrying strap which extends around the neck of the operator. All that the operator need do then is to lift the cover member 29 and swing the front wall and cover member unit about the hinge 25 forwardly and downwardly to the depending position illustrated in FIG. 1 in which the camera is ready for focusing and making new exposures.

In accordance with the invention, the front wall 27 of the carrying case is deepened to provide a trough-like recess 41 which extends forwardly when the front wall is in normal closed position in front of the camera, or rearwardly when it is swung down to the open position illustrated in FIGS. 1 and 2, and which is of such extent to permit the ever-ready case to be closed without having to remove an objective sun hood 43 mounted on the exposure lens 15 of the camera. In addition, the deepening or extension of the front wall 27 is made sufficiently great to allow the fitting of an intermediate holding plate 45 within the recess 41, while still allowing the case to be closed over the sun hood 43. As can be better seen in FIGS. 2 and 3, the back of the plate 45 is provided with suitable holding attachments or pockets 47 and 49 for various camera accessories such as supplementary lenses or filters. The holding plate 45 with the various accessory receiving pockets or holders 47, 49 may be collectively called a holding device for optical assessories.

The intermediate plate 45 is provided with a releasable fastening or connection with the front wall 27 which at the same time serves as a hinge for allowing the intermediate plate 45 with the holding attachments 47, 49 to be swung forwardly as shown in FIG. 2, to a position braced against the cover member 29. For his purpose, there are fastened to the intermediate plate 45 at either side at the one end a pair of laterally flexible arms 51 on each of which is mounted a releasable fastener member 53. The releasable fastener which is desirably used is preferably the commonly known press button or snap fastener. Mating snap fastener parts 55 are mounted on the sides of the deepened recess 41 of the front wall 27.

With the holding device 45 disposed within the recess 41 in the front wall 27 in an out of the way or storage position as shown in FIG. 1, and the snap fasteners 53, 55 coupled together, the holding device is desirably further retained or secured in this position by another snap fastener 57 on a strap 59 at the opposite end of the device from the fasteners 53. This fastener 57 may be coupled with a suitable mating member 60 (FIG. 2) on the front wall 27, in the position shown in FIG. 1. In this storage position the optical accessories mounted in the holding attachments 47, 49 on the back of the intermediate plate 45 are closed off outwardly and disposed within a substantially closed cavity so as to be protected when the case is open. Further protection against dust and dirt may be provided if desired by an encircling packing rim 61 on the intermediate plate 45, which bears against the insides of the side walls of the recess 41.

To gain access to the optical accessories, the fastener 57 is uncoupled and its strap 59 is pulled forwardly to swing the holding device about the pivots provided by the snap fasteners 53, 55 at either side. The holding device may be supported in an open or operative position by engaging its free end with the free end of the cover member 29, and in this position is clamped strut-fashion because of the spring operative in the hinge 31 of the cover member. In other words, the free end of the accessory-holding plate 45 is supported by the cover member 29, and at the same time it acts as a strut or prop to hold the cover member in an approximately horizontal position and prevent it from swinging upwardly under the influence of its spring associated with its hinge 31. In this position of the parts (FIG. 2) the holder 45 is almost horizontal, being inclined only slightly downwardly, and the filters, supplementary lenses, or other accessories in the pockets 47, 49 are held comparatively safely against accidental dislodgement. In this operative position, the optical accessories received within the holding attachments 47, 49 are freely accessible from above and within sight of view of the photographer. Having selected the supplementary lenses or filters or the like which he wants, the operator may then swing the holding device upwardly and inwardly and recouple the snap fastener 57, 60 before proceeding with further manipuation of the camera.

A particular advantage of the invention is that the optical accessories are stored in a dust-free manner within the carrying case, although they are readily accessible at any time. The movement of the device from storage position to operative position may be easily carried out by the operator when the camera and case are suspended from his neck by a strap. Another special adavantage is that the holding device may be quickly interchanged with another holding device provided with a different set of filters and the like or an entirely different set of accessories, merely by releasing or pulling apart the snap fasteners 53, 55 which serve as disconnectable hinges, and removing the device 45, etc., from the carrying case, and replacing it by another similar device, which is then quickly fastened in the carrying case by a reverse procedure.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A carrying case of the ever-ready type for photographic cameras, said carrying case comprising a pair of side walls fixed to a rear wall and a bottom wall, a front wall hinged to said bottom wall and a cover member hinged to the free end of said front wall, said front wall and cover member being movable forwardly and downwardly from a closed position forming a box with said other walls to an open position depending downwardly, said front wall bulging forwardly to form a deep recess, a holding plate pivotally mounted within said recess of said front wall near its free end for movement between a storage position disposed within said front wall and an operative position extending outwardly into engagement with said cover member when said front wall and cover member are swung downwardly and forwardly to an open position, and attachment holding means secured on the face of said holding plate which is faced toward said front wall when the holding plate is in said storage position, for receiving optical accessories, the accessories being enclosed within said front wall when said holding plate is in said storage position and being accessible to the operator when said holding plate is swung into its operative position.

2. A construction as defined in claim 1, wherein said holding plate and accessory holding means constitutes an interchangeable unit, the pivotal mounting for said holding plate being provided by a snap fastener at either side.

3. A construction as defined in claim 1, wherein said holding plate has an encircling packing ring fitted to the internal contour of the sides of said recess in said front wall, to keep dust and dirt out of the cavity between said front wall and holding plate when in the storage position.

4. In an ever-ready carrying case for a photographic camera of the twin lens reflex type, said ever-ready case having a pair of side walls fixed to a bottom wall and a rear wall, a front wall hinged to the forward edge of said bottom wall, and a cover member hinged to the free end of said front wall, said front wall and cover member being movable forwardly and downwardly from a closed position forming a box with said other walls to an open position depending downwardly, the improvement wherein said front wall is deepened to form a recess extending forwardly away from the contained camera when the front wall is in closed position, a holding plate having a plurality of pockets secured to one face thereof for receiving optical accessories, and releasable fastener means for mounting said holding plate within said deepened front wall with said pockets disposed within a substantially closed cavity between said front wall and holding plate, said holding plate being pivotable forwardly about said releasable fastening means to an operative position braced against said cover member.

5. A construction as defined in claim 4, wherein said releasable fastener means are snap fasteners, and further including an additional snap fastener strap at the top of said holding plate engaged with said front wall to maintain said holding plate in a position enclosed within said recess in said front wall.

References Cited in the file of this patent
UNITED STATES PATENTS 2,290,307    Wicker  ---------------- July 21, 1942
2,681,600    Heidecke  -------------- June 22, 1954